Sept. 15, 1959 C. A. ARTZ 2,904,772

PRINTED CIRCUIT CONSTRUCTION AND METHOD OF MAKING

Filed May 20, 1954 2 Sheets-Sheet 1

INVENTOR.
Charles A. Artz

BY

J. W. Douglas

ATTORNEY

Sept. 15, 1959 C. A. ARTZ 2,904,772

PRINTED CIRCUIT CONSTRUCTION AND METHOD OF MAKING

Filed May 20, 1954 2 Sheets-Sheet 2

INVENTOR.
Charles A. Artz
BY
J. D. Douglas
ATTORNEY

United States Patent Office 2,904,772
Patented Sept. 15, 1959

2,904,772

PRINTED CIRCUIT CONSTRUCTION AND METHOD OF MAKING

Charles A. Artz, Glen Ellyn, Ill., assignor to Admiral Corporation, Chicago, Ill., a corporation of Delaware Application May 20, 1954, Serial No. 431,133
14 Claims. (Cl. 339—193)

This invention relates to improvements in means for installing electron tube sockets in a printed circuit panel wherein the conductors, leading from sockets, in which the tubes are mounted, are formed on a plate of dielectric material.

Common practice, in connection with this class of apparatus has involved fastening the sockets to the side of a dielectric plate opposite the side on which the printed conductors are formed. It was a comparatively slow process frequently involving injury to the plate which then had to be discarded, especially when the matter of anchoring the sockets to the plates was performed by unskilled labor.

Owing to the present invention time is saved in introducing the sockets into assembly with a printed circuit plate. The frequency of injury to the plate is greatly lessened or eliminated and the final product, that is, the combined printed conductor-bearing plate and sockets, which has been soldered, is more susceptible to being tested for defective circuitry than was previously possible. In an emergency a standard socket may be used to replace one of the present novel sockets, with very little adjustment by a service man.

Other advantages of the invention will be set forth in part hereinafter and in part will be obvious herefrom, or may be learned by practice with the invention, the same being realized and attained by means of the instrumentalities and combinations pointed out in the appended claims.

A better understanding of the invention and one means by which it may be practiced is illustrated in the drawings in which.

Figures 1, 2, 3, 4, 5, 6, 7, 8:
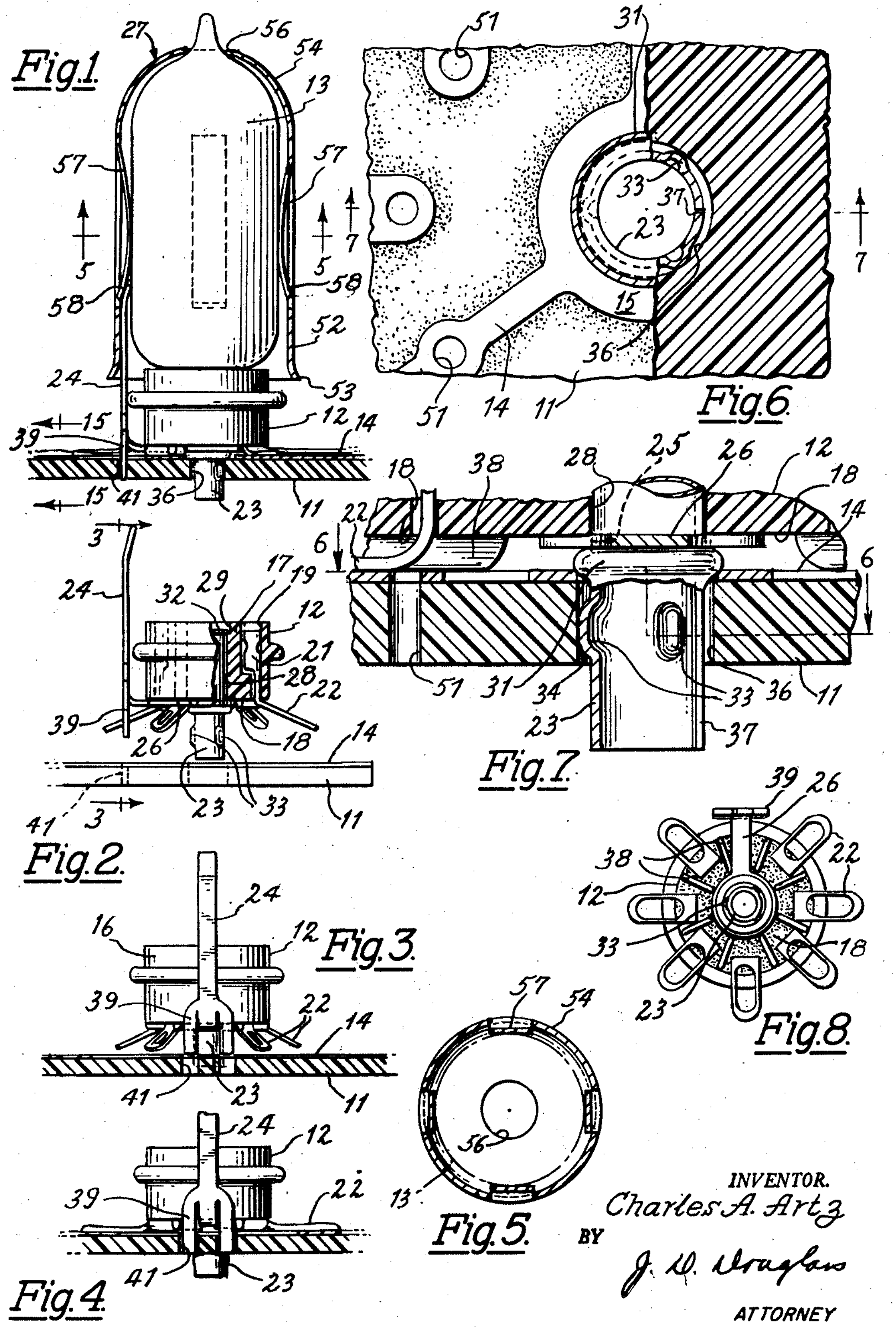
Fig. 1 is a fragmentary view of a vacuum tube socket and printed circuit plate in which the invention is incorporated, the socket being shown in elevation and the printed circuit plate in section.
Fig. 2 is a fragmentary elevational view of the printed circuit plate and the socket, with the socket partly broken away, prior to assembly of the socket with the printed circuit plate.
Fig. 3 is a view taken along the line 3—3 in Fig. 2 and showing the socket just before it is coupled to the printed circuit plate.
Fig. 4 is a view corresponding to Fig. 3, the brush having been broken away and the socket anchored to the printed circuit plate.
Fig. 5 is a horizontal section taken on line 5—5 of Fig. 1.
Fig. 6 is a horizontal section taken on line 6—6 of Fig. 7, the printed circuit plate having been removed.
Fig. 7 is a fragmentary vertical section taken on line 7—7 of Fig. 6.
Fig. 8 is a bottom plan view of the socket shown in Fig. 2.
Figure 9:
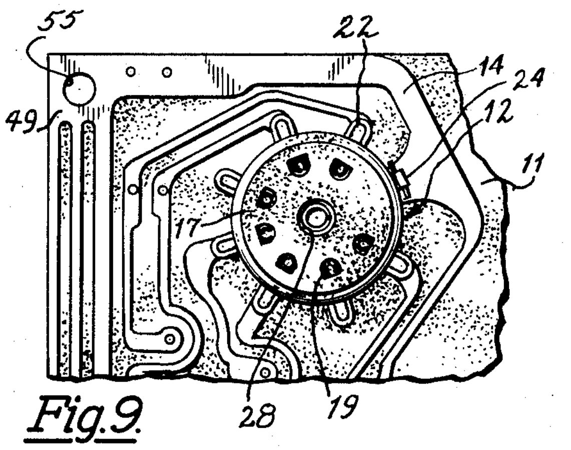
Fig. 9 is a top plan view of the socket, in anchored association with a portion of the printed circuit plate.

The reference character 11 is used throughout the drawings to denote a support taking the form of a plate of some suitable dielectric material, such as a phenolic condensation product known to the trade as Bakelite. Not only does the plate provide support, in a manner later to be described, for a socket 12 to carry an electron tube 13 but it carries a series of irregular-shaped conductors 14 disposed on its upper side, some of which lead from a locus 15 below the socket.

The socket 12 includes a cylindrical base or body 16 having upper and lower ends 17 and 18 respectively. The upper end 17 is formed with a series of recesses 19 therein, arranged arcuately around its axis, in each of which is a tube pin receiving terminal 21 formed with a tang or lug 22 thereon extending through the end 18, below which all the lugs are bent outward radially. In addition, the socket is provided with an axial mounting pin 23 and beside its periphery with a vertical contactor, brush or grounding strip 24. The brush 24 is formed with a lateral arm 26 by which it is supported from and connected to the pin 23, in a manner later to be described, so that it may have operative engagement with a hood or tube shield 27, to be described hereinafter.

To understand the facilities for initially attaching the socket 12 to plate 11, the structure of the pin 23 and its relationship to the base 16 will first be considered. It is cylindrical and preferably formed from a single sheet of metal having opposed edges between which the plate is bent arcuately until the edges are in contiguity so as to provide a split 37 longitudinally of the pin (Fig. 7). It passes through a bore 28, at the axis of the base 12, from a counterbore 29 (Fig. 2) at the end 17 to a level below that of the end 18. It also passes through a hole 25 (Fig. 7) in the arm 26 which is clamped in engagement with the end 18 by a circumferential bead 31 on the pin, the bead being held against displacement from the base 12 by a flange 32 (Fig. 2) within the limits of the counterbore 29. Intermediate the bead 31 and its lower end, the walls of the pin 23 are distended outward at angularly spaced points to provide exterior projections or centering members 33 extending longitudinally of the pin and having cam portions 34 at their lower ends.

The plate 11 is provided with a mounting bore 36 of a diameter greater than that of the pin, but only adequate to receive the centering members when the pin is forced into the bore, to provide a binding relationship between the walls thereof and tips of the dimples 33.

The lugs 22, besides extending radially of the base, initially slant downward therefrom, as shown in Fig. 2, preferably at an inclination of 15° from horizontal. As the pin is inserted in the bore 36, the cam parts 34 of the projections 33 first engage the walls thereof and assist in initiating a binding action between the walls of the bore and the projections 33 by guiding said projections into frictionally anchored relationship therewith as the pin is urged downward to a limit governed by engagement of a plurality of radially extending ribs 38 (Figs. 7 and 8) on the end 18 with the plate 11, each of the ribs being between adjacent lugs 22. Furthermore, the binding action may be more uniform by a capacity of the projections 33 to be displaced inwardly very slightly by the walls of the bore 36, due partly to slight resilience of the pin and the fact that it is split along its longitudinal edge at 37. Concurrently with movement of the projections 33 toward their final anchored position, just described, the outer ends of the lugs 22 engage with the conductors 14 and are deflected transversely thereof and therefore biased into engagement with said conductors by the time the ribs 38 engage the plate 11. The binding relationship between the projections 33 and plate 11 maintains the lugs in this status after the force necessary to create the biased status of the lugs has been removed.

Figure 16:
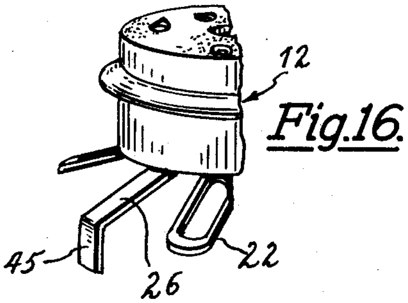
Fig. 16 is a fragmentary perspective view showing a second embodiment of the socket.
Figure 11:
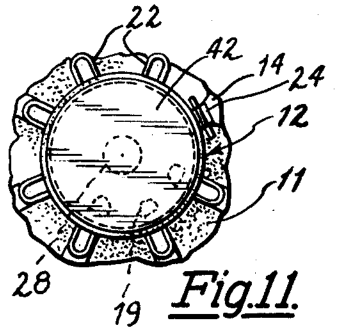
Fig. 11 is a view corresponding to Fig. 9 showing the solder-excluding element applied to the socket, the printed circuit plate being largely removed.

It is, of course, essential that means be provided to assure a state of preselected registration between the conductors 14 and the lugs 22 when the socket is introduced into assembly with the plate. Such means may take the form of a finger or registration element, eccentric to the axis of the socket and rigid relative thereto, which extends downward to a level below that of the socket to be received in a recess in the plate 11. This structural feature may be provided in any suitable manner such as by a pair of fingers 39 (Fig. 3) on the arm 26 or a single finger 45 as in the alternative embodiment Fig. 16. In the embodiment shown in Fig. 3, the fingers 39 extend from either side of the brush 24 and continue downward to be received in registration apertures 41 in the plate 11 when the respective lugs 22 are biased into engagement with the conductors 14.

Since electronic circuits commonly involve a plurality of vacuum tubes, differing in characteristics, and a plurality of tubes of different characteristics are capable of being inserted in a given socket, it follows that some means must be resorted to to always assure orienting a tube of given characteristics in the circuit comprising the conductors on the plate. As one safeguard for this, the spacing between the axis of the bore 36 and the apertures 41 differs according to each preselected vacuum tube and is equal to the spacing of the finger or fingers 39 from the axis of pin 23. The other contemplated feature precluding insertion of a tube at the wrong point in the circuit is provided by the single finger 45 on the arm 26 in the embodiment of Fig. 16, which is incapable of entering either of the apertures 41 but is formed to be received by other registration apertures, not shown, in the plate 11.

Figure 10:
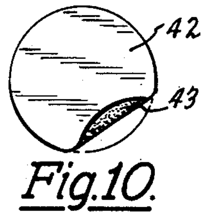
Fig. 10 is an elevational view of the solder-excluding element, partly broken away.

Once the socket 12 is anchored to the plate 11 in a temporary manner, as above indicated, suitable means must be provided to exclude solder from the recesses 19 when the plate 11 is inverted and brought into communication with a bath of molten solder, later to be referred to in greater detail. The excluding means may take the form of sheets or discs of paper or suitable plastic material proportioned to concurrently cover all the recesses 19. The sheets are secured to the surface 17 by a suitable slow drying adhesive applied either to the surface 17 or one of the surfaces of the sheets. In practice of the invention, a so-called non-drying adhesive coated paper commonly known as "Scotch tape" was used with good results, the Scotch tape being provided in the form of discs 42 (Fig. 10) having a sticky side 43. Other forms of solder excluding means, such as caps having side walls for intimate association with the periphery of the socket, are also contemplated.

Figures 12, 13:
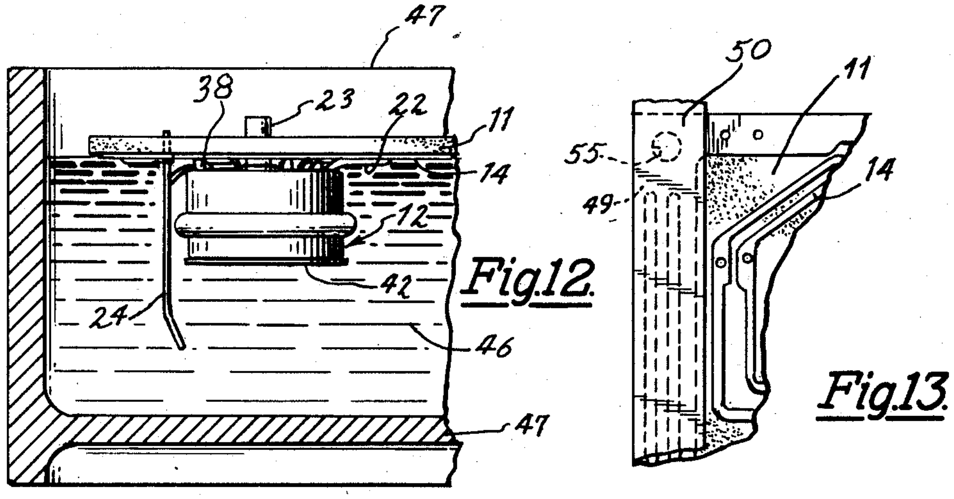
Fig. 12 is a fragmentary sectional view showing the means for treating the plate-supported socket and means for bonding the printed conductors and terminal lugs together.
Fig. 13 is a plan view corresponding to Fig. 9 and showing the mask applied to the terminal conductor.
Figure 15:
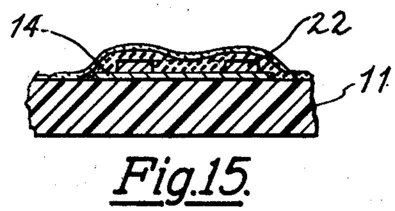
Fig. 15 is an enlarged section taken on line 15—15 of Fig. 1.

Once the discs are in place over the recesses 19, as indicated, the assemblies of sockets, plate and conductors are inverted and brought into contact with the surface of a bath of molten solder 46 contained in a receptacle 47, as shown in Fig. 12.

The duration of contact with the solder of plate 11 and plate supported elements alluded to may vary and depends on the composition of the plate and socket, as well as the temperature to which the solder is heated.

The temperature should not be so high and the exposure for such a period as to cause blistering of the dielectric or loosening of the conductors therefrom or for the plate to disintegrate or become warped. On the other hand, the duration should, of course, be for a period long enough for heat of the solder to overcome surface tension in minute crevices so that good contact between the parts is assured. Generally speaking, the duration of the soldering operation should be from three to five seconds when the temperature of the solder is from 475 degrees to 550 degrees Fahrenheit. In the course of several tests, good soldered joints were produced when the solder was heated to 515 degrees Fahrenheit and the plate subjected to the solder for three or four seconds. During this period the Scotch tape discs 42 remained in operative association with the end 17 and the ribs 38 segregated adjacent pairs of lugs 22 from the solder so that it flowed over the lugs but did not cause a short between them in the process of bonding them to the conductors 14.

Figure 14:
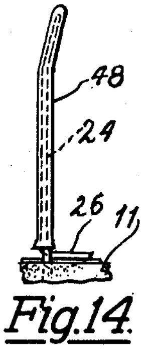
Fig. 14 is an elevational view of the brush in the position it occupies in Fig. 2 with a masking sleeve thereover, the base portion of the socket being largely broken away.

After the plate 11 and parts supported therefrom have been removed from the solder and allowed to cool, a removable mask or sleeve 48 (Fig. 14) of some suitable material is slipped over the brush 24. Also a mask 50 (Fig. 13) of Scotch tape is placed over conductive surface 49 at the edges of the plate. With the masks and discs 42 still in place, the conductor side of the plate is treated with some liquid which, when dried, acts not only as an insulator to obviate shorting, in the course of time, by dust and dirt accumulations on the plate, but as an air excluding agent to prevent the conductors 14 from oxidizing, especially at their junctions with the plate, and thereby becoming loosened from said plate. Preferably the liquid may take the form of some silicone compound which may dry at room temperatures and whose drying time may be reduced by exposing the wet surfaces to air at an elevated temperature or by exposing the surfaces to the rays of infra red heat lamps. This liquid may be either brushed or sprayed on the parts as convenient.

After the plate 11 and parts carried thereby have been treated with the silicone compound the masks 49, sleeve 48 and solder excluding element 42 are, of course, removed. This may be done anytime after the application of the compound to the parts. When effected, the previously masked surfaces are, of course, free of insulation so that the beads of anchor screws, not shown, passed through holes 55 (Fig. 13) in the plate 11 may be in electrical communication with the conductor about said holes and similarly the brush 24 may have conductive contact with the tube shield 27, as shown in Fig. 1.

For the purpose of testing for defects in the soldered connections between the lugs 22 and conductors 14, a series of test holes 51 (Fig. 6) are provided in the plate 11. They also pass through the conductors 14 on an arc about the axis of the socket in an arrangement for each of the holes to be superimposed by a different lug 22. Owing to this feature an inspector or service man may test all the tube socket connections from one side of the plate 11 by inserting a needle-like instrument severally through the holes 51 and into engagement with the lugs 22.

As will be noted (Fig. 6), the mounting hole 36 continues through a central portion of one of the conductors 14 of some of the socket loci. The mounting pin 23, therefore, in the neighborhood of the bead 31 makes contact with one of the conductors connected for grounding of the pin so that it may act in a shielding relationship to some of the prong receiving terminals 21 relative to other of said terminals.

As already indicated, the brush 24 is for cooperation with the hood or shield 27. Although the use of grounded metallic hood over a vacuum tube for shielding the elements of the tube is well known, the particular hood employed in connection with the improved socket, is also novel. In detail, it is preferably drawn from sheet metal to include a cylindrical portion 52 of diameter greater than the tube 13. While its lower end is flanged outward as at 53 for the sake of rigidity, it has an inwardly flanged portion 54 at its upper end in overhanging relation to the tube 13, thereby providing a stop for engaging the top of the tube to preclude engagement of the lugs 22 by the lower end of said hood, yet affording an aperture 56 through which the tip of the tube may extend.

Means for spacing the walls 52 from the tube 13 is provided by a plurality of tongues 57 struck from said walls in such an arrangement as to be cantilevered from the upper end of the hood and to extend downward and inward sufficiently to engage the tube 13 and be biased thereagainst by being deflected outwardly by the tube. As a convenience for positioning the hood 27 over the tube 13, the lower end of the tongues are bent to slant outward as at 58 so that oppositely disposed pairs of the tongues may be cammed apart by their initial engagement with the tube when the hood is slipped thereover.

While I have shown my invention in an embodiment thereof, I am aware that extensive other departures may be made therefrom without departing from the spirit or scope of the invention.

I claim:

1. In printed circuit apparatus comprising a vacuum tube socket having a body from the periphery of which may be supported a cylindrical tube shield and within the periphery of which is a series of angularly spaced tube prong-receivable terminals, each of which is formed with a terminal lug radial of said periphery and also a conductor support for the socket carrying a plurality of printed conductors leading to a locus centrally of which is a bore and eccentrically of which bore is a recess, a mounting member fixed to the body at the axis thereof and extending downward therefrom and being capable of being received by the bore and serving to shield at least two of the terminals from each other, a brush member beside the body fixed thereto and in electrical communication with said mounting member for frictionally engaging a tube shield when it is operatively carried by the body, a register element continuing downward from the brush member to a level below that of the body for extension into the recess concurrent with extension of the mounting member into the bore thereby to provide a predetermined angular arrangement of the lugs relative to the conductors when said conductors are engaged by said lugs, at least one of said conductors extending to the bore for engagement with said mounting member and one of the lugs for shielding of predetermined lugs from each other, centering members at the periphery of the mounting member, said centering members being capable of being collectively in binding cooperation with the walls of the bore when said mounting member is forced therein to anchor the lugs in temporary engagement with the conductors until they are bonded to each other by concurrently subjecting them to fused solder.

2. A method of producing a printed circuit unit having a dielectric plate bearing printed conductors on its upper side in soldered communication with terminals of a socket supported also on said upper side, said conductor extending radially from a locus centrally of which is a mounting bore, said socket having an upper end formed with tube prong receivable openings therein and a lower end with a mounting pin extending downward therefrom, the pin being of diameter less than that of the mounting bore and having equi-angularly spaced centering members extending to an arc on a radius at least equal to the radius of the bore, the socket also having radial terminal lugs at its lower end slanting downward to extremities below the level of said lower end, and an angular registration member offset relative to said pin and connected thereto, and said plate having a registration aperture spaced from the mounting aperture; said method comprising the steps of bringing the terminal lugs into operative association with the conductors by inserting the pin into the bore and concurrently the registration member into the aperture and exerting force axialwise of the socket to bias the lugs into engagement with said conductors by deflecting said lugs transversely thereof within their elastic limits after their outer ends have initially engaged said conductors and the centering members are concurrently forced into the bore thereby for said lugs to be retained under deflection as a temporary connection between said lugs and said conductors, covering the openings by applying a removable solder-excluding element to the upper end of the socket, applying a liquid flux to the conductors and lugs, bringing the upper side of the plate into communication with the surface of a bath of molten solder long enough for the conductors and lugs to acquire a coating of said solder, and removing the assembly from the bath thereby for the lugs and conductors to be permanently bonded together by the solder when it has solidified and removing the solder excluding element from the socket.

3. A method according to claim 2 in which the flux is sprayed on to the conductor side of the printed circuit plate.

4. A method of producing a printed circuit unit having a dielectric plate bearing printed conductors on its upper side in soldered communication with terminals of a socket supported also on said upper side, said socket having an upper end formed with tube prong receivable openings therein and a lower end with a mounting pin extending downward therefrom, the pin being of diameter less than that of the mounting bore and having angularly spaced centering members extending to an arc on a radius at least equal to the radius of the bore, the socket also including radial terminal lugs at its lower end slanting downward to extremities below the level of said lower end, and an angular registration member extending below the level thereof, a brush continuing upward therefrom beside said socket and being in fixed conductive relationship to the pin, and said plate having a registration aperture spaced from the mounting aperture; said method comprising the steps of bringing the terminal lugs into operative association with the conductors by inserting the pin into the bore and concurrently the registration member into the aperture and exerting force axialwise of the socket to bias the lugs into engagement with said conductors by deflecting said lugs transversely thereof within their elastic limits after their outer ends have initially engaged said conductors and the centering members are concurrently forced into the bore thereby for said lugs to be retained under deflection as a temporary connection between said lugs and said conductors, covering the openings by applying a removable solder-excluding element to the upper end of the socket, applying a liquid flux to the conductors and lugs, bringing the upper side of the plate into communication with the surface of a bath of molten solder long enough for the conductors and lugs to acquire a coating of said solder, and removing the assembly from the bath thereby for the lugs and conductors to be permanently bonded together by the solder when it has solidified, applying a masque to the brush and to anchor portions of the conductors, applying a liquid compound to the conductor side of the plate, said compound being capable of drying at room temperatures to provide a dielectric film, and removing the masques and solder excluding element after the liquid compound has been applied.

5. In combination, a dielectric panel having an opening therein and printed circuit conductors on one face including a conductor immediately adjacent to said opening, and a tube socket comprising a dielectric socket body having a plurality of recesses therein and tube pin terminals in said recesses, a mounting pin connected to said socket body and extending beyond the inner end of the socket body into the opening in said panel, said mounting pin beyond the inner end of the socket body having a transverse outwardly protruding shoulder which engages the printed circuit conductor which is immediately adjacent to the opening, a plurality of spaced protruding portions on the inner end of said socket body which engage said face of the panel, and terminal lugs connected to said terminals and extending across the inner end of the socket body between said spaced protruding portions and engaging said printed circuit conductors on the panel.

6. The combination of claim 5, wherein said mounting pin includes a tubular sheet metal portion which has a lengthwise slit therein and a plurality of outwardly protruding projections on its periphery which are spaced apart around its periphery and frictionally engage the wall of the panel which defines said opening therein.

7. The combination of claim 6, wherein said shoulder is formed by an integral circumferential bead on the mounting pin.

8. The combination of claim 5, wherein said panel is formed with a registration recess therein which is spaced from said opening, and wherein there is provided a registration member connected to said mounting pin between said shoulder thereon and the inner end of the socket body, said registration member extending across the inner end of the socket body and at its outer end having an offset portion which is received in said registration recess in the panel.

9. The combination of claim 5, wherein said panel is formed with a plurality of holes at the connections of the terminal lugs to the printed circuit conductors which extend through said conductors for the reception of a probe inserted therein from the opposite face of the panel to test the electrical connections between the terminal lugs and the printed circuit conductors.

10. In combination, a dielectric panel having printed circuit conductor portions thereon and a mounting opening therein and a registration recess therein which is spaced from said opening, and a tube socket having a mounting pin received in said mounting opening, said socket having a plurality of recesses therein and tube pin terminals in said recesses, terminal lugs connected to said terminals and extending outward from the tube socket and engaging said printed circuit portions on the panel, and a registration member connected rigidly to the socket and extending outward therefrom and received in said registration recess in the panel.

11. In combination, a dielectric panel having printed circuit conductors thereon, said panel having a mounting opening therein and a registration recess therein, a tube socket body having a plurality of recesses therein and tube pin terminals in said recesses, a mounting pin connected to the socket body and projecting beyond one end of the socket body and frictionally received in said mounting opening in the panel to support the socket body from the panel, terminal lugs connected to said terminals and extending outward across said one end of the socket body into engagement with said printed circuit conductors on the panel, and a registration member connected rigidly to said mounting pin and extending therefrom outward across said one end of the socket body and having an offset end portion received in said registration recess in the panel.

12. A method of producing a printed circuit panel and tube socket unit which comprises the steps of: mounting at one face of a panel which has printed circuit conductors thereon, a tube socket which has recesses open at its outer end away from the panel, tube pin receiving terminals in said recesses, terminal lugs connected to said terminals and engaging the printed circuit conductors on the panel, and a solder-resistant covering extending across the open ends of said recesses; dipping the panel and socket into molten solder with the outer end of the socket downward and said one face of the panel exposed to the solder to solder the terminal lugs to the printed circuit conductors on the panel; and thereafter removing said covering from the open ends of the recesses.

13. A method of producing a printed circuit panel and tube socket unit which comprises the steps of: providing a dielectric panel having an opening therein and printed circuit conductors on one of its faces, including a printed circuit conductor immediately adjacent to said opening; providing a tube socket comprising a dielectric socket body having recesses therein which are open at the outer end of said socket body, tube pin receiving terminals in said recesses, terminal lugs connected to said terminals and extending across the inner end of the socket body, protruding ribs on the inner end of the socket body between said terminal lugs, and a mounting pin which projects beyond the inner end of the socket body and presents a transverse shoulder beyond the inner end of the socket body, said pin being shaped and dimensioned to be frictionally received in said opening in the panel; inserting said mounting pin into the opening in the panel to position said shoulder on the pin in contact with the printed circuit conductor which is immediately adjacent to said opening and to position said ribs engaging said one face of the panel and the terminal lugs engaging the printed circuit conductors on said one face of the panel; covering the open ends of said recesses in the socket body with a sheet of solder resistant material adhesively secured to the outer end of the socket body and removable therefrom; inserting the panel and socket into a bath of molten solder with the outer end of the socket body downward and said one face of the panel contacted by the solder for a time sufficient to solder the terminal lugs to the printed circuit conductors and to solder the shoulder on the mounting pin to the printed circuit conductor which is immediately adjacent to said opening in the panel; and thereafter removing said sheet from the outer end of the socket body.

14. In combination, a printed circuit panel having conductor portions thereon and a mounting opening therein and a registration recess therein spaced from said opening, a socket having a mounting pin received in said mounting opening, said socket having a plurality of recesses therein for containing pin terminals, lugs connected to said terminals and extending outward from the socket for engagement with said conductor portions, and a registration member connected rigidly to the socket and extending outward therefrom for engagement with said registration recess in the panel.

References Cited in the file of this patent

UNITED STATES PATENTS

| | | |
|---|---|---|
| 1,702,234 | Goodrich | Feb. 12, 1929 |
| 1,740,375 | Simonds | Dec. 17, 1929 |
| 1,831,534 | Judisch | Nov. 10, 1931 |
| 2,109,106 | Dressel | Feb. 22, 1938 |
| 2,542,144 | Kearns | Feb. 20, 1951 |
| 2,595,188 | Del Camp | Apr. 29, 1952 |
| 2,628,299 | Gaiser | Feb. 10, 1953 |
| 2,635,131 | Greatbatch | Apr. 14, 1953 |
| 2,742,627 | Lazzery | Apr. 17, 1956 |
| 2,764,751 | Gnadke | Sept. 25, 1956 |
| 2,776,415 | McGinley | Jan. 1, 1957 |

FOREIGN PATENTS

| | | |
|---|---|---|
| 247,937 | Great Britain | Nov. 18, 1926 |
| 282,376 | Great Britain | Feb. 28, 1929 |
| 371,099 | Great Britain | Apr. 21, 1932 |
| 639,907 | Great Britain | July 5, 1950 |
| 689,866 | Great Britain | Apr. 8, 1953 |

OTHER REFERENCES

Printed Circuit Techniques, National Bureau of Standards circular 468, issued Nov. 15, 1947.